R. R. HITT.
BOLL WEEVIL CATCHER
APPLICATION FILED DEC. 16, 1919.
1,386,502.
Patented Aug. 2, 1921.
2 SHEETS—SHEET 1.
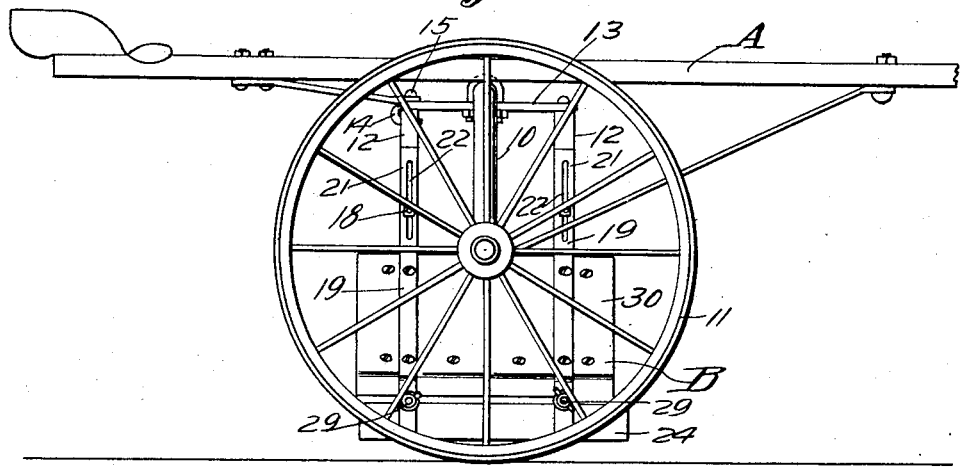
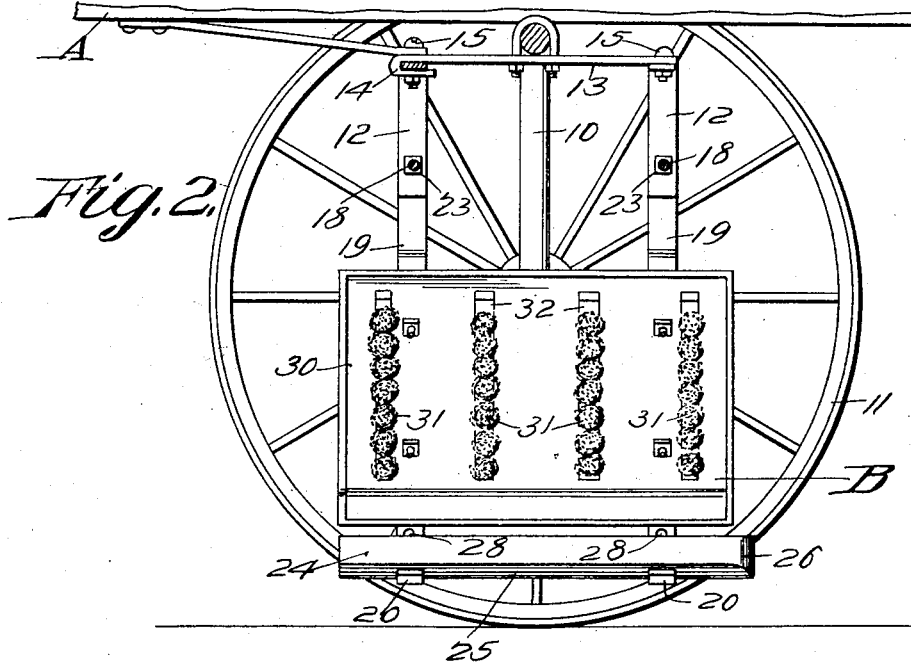
Inventor
Reed R. Hitt,
By Talbert & Parker
Attorneys

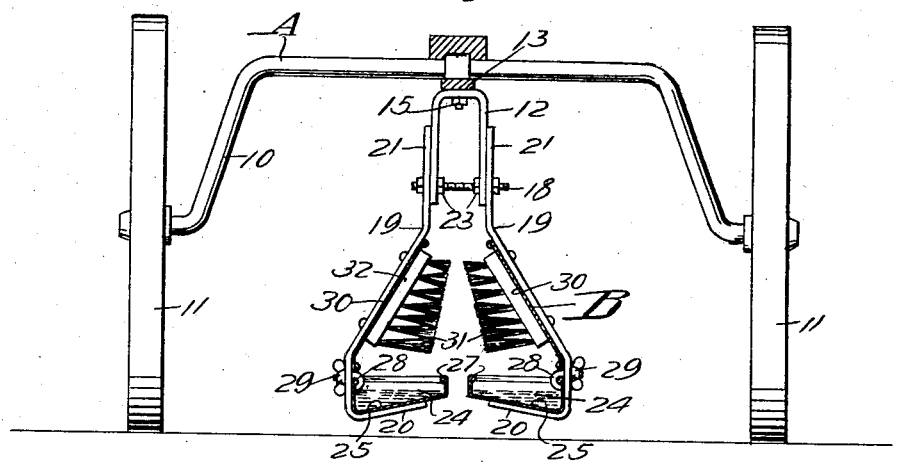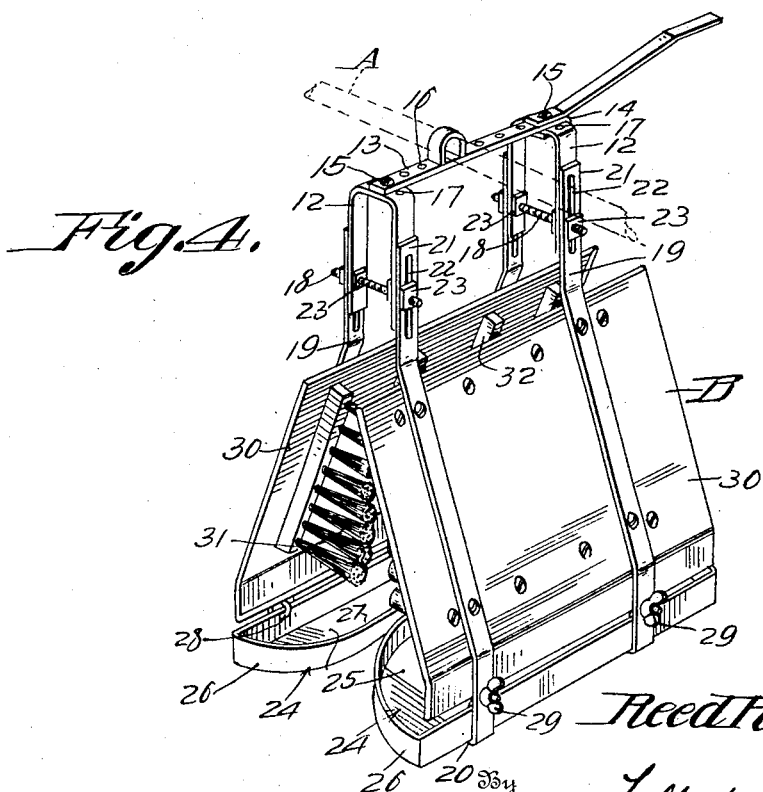

UNITED STATES PATENT OFFICE.

REED R. HITT, OF ENERGY, TEXAS, ASSIGNOR, BY DIRECT AND MESNE ASSIGNMENTS, TO HITT BOLL WEEVIL MACHINE COMPANY, A CORPORATION OF TEXAS.

BOLL-WEEVIL CATCHER.

1,386,502.   Specification of Letters Patent.   Patented Aug. 2, 1921.

Application filed December 16, 1919. Serial No. 345,322.

*To all whom it may concern:*

Be it known that I, REED R. HITT, citizen of the United States of America, residing at Energy, in the county of Comanche and State of Texas, have invented new and useful Improvements in Boll-Weevil Catchers, of which the following is a specification.

The primary object of the invention is the provision of an attachment or device of this character for use with a cultivator or like implement so as to catch the weevils during the cultivation of the cotton, the boll weevil being removed from the growing cotton and deposited or caught within pans or trays which contain a medium adapted to exterminate them.

Another object of the invention is the provision of a device or catcher of this character wherein the pans or trays are detachably held in a novel manner so that the boll weevil when caught within the trays may be subsequently dumped therefrom.

A further object of the invention is the provision of a device or catcher of this character which will catch and destroy insects without injury to the plants.

A still further object of the invention is the provision of a device or catcher of this character which is readily adjustable and is positive in its action in removing insects from growing plants.

A still further object of the invention is the provision of a device or catcher of this character which is simple in construction, thoroughly reliable and efficient in its operation, strong, durable and inexpensive in manufacture.

With these and other objects in view the invention consists in the features of construction, combination and arrangement of parts, as will be hereinafter fully described, illustrated in the accompanying drawings and pointed out in the claims hereunto appended.

In the accompanying drawings:

Figure 1 is a side elevation showing a device or catcher constructed in accordance with the invention applied.

Fig. 2 is an enlarged vertical longitudinal sectional view.

Fig. 3 is a vertical transverse sectional view through the device or catcher.

Fig. 4 is a perspective view of the device detached from its wheeled support.

Similar characters of reference are employed in all of the above described views, to indicate corresponding parts.

Referring to the drawings in detail, A designates generally a support having the upwardly arched axle 10 supporting the wheels 11 as usual and in the arch of the axle 10 is supported the device or catcher B hereinafter fully described.

The device or catcher B comprises a pair of inverted substantially U-shaped hangers 12 which are spaced the desired distance from each other and are connected through the medium of a bar 13 which at one end is formed with a hook like terminal 14 adapted to embrace one of the hangers 12 and this terminal together with the other terminal are detachably fastened to the hangers 12 through the medium of bolt members 15, the bar 13 being formed with a series of spaced holes 16 and likewise the closed ends of the hangers 12 are formed of spaced holes 17 so that the bolt members 15 can be adjusted for detachably and adjustably connecting hangers 12 and the bar 13 together as will be apparent.

Mounted transversely in the hangers 12 are headless bolts 18 on which are supported downwardly divergent suspension arms 19 having inwardly and upwardly bent extension rest 20 at their lower ends while the upper portions are formed with vertical extensions 21 having slots 22 in which are engaged the bolts 18 the latter being fitted with lock nuts 23 so that the arms can be fastened in vertically adjusted position upon the hangers 12 as will be obvious.

Removably mounted upon the rest 20 are pans or trays 24 each being provided with an outwardly inclined bottom 25 corresponding to the disposition of the extension rest 21, the forward ends of said pans being rounded at 26 so as to present an entrance mouth for the plants into the device or catcher. The marginal upper edge of each pan is formed with an inturned flange 27 while engaged in the arms 19 are hooks 28 the bills of which engage the flange 27 while the shanks of said hooks have adjustably threaded thereon winged nuts 29 and in this manner the pans are detachably fastened to the arms. When these pans are positioned as illustrated in Figs. 1, 2, 3 and 4 of the drawings the inner walls are spaced longitudinally to permit the passage therebetween of the growing cotton or plants and these pans are adapted to contain a liquid, preferably kerosene or kerosene and water mixed so that when the boll weevil or insect falls therein the same will be killed or exterminated.

Arranged above the pans 24 and secured to the downwardly divergent portions of the arms 19 are plates 30 which are disposed to diverge correspondingly to the arms and on the inner faces of these plates are carried a plurality of brushes 31 the stocks 32 of which are disposed vertically and are bolted or otherwise fastened to the plates. The bristles constituting the brushes 31 gradually increase in length from the upper ends of the stocks to the lower ends thereof so the same will be positioned so that when the stalks of the cotton or other growing plants pass between the plates 30 the insects will be brushed from the plants and directed into the pans 24, the plates 30 being made from a like material while the arms, the hangers and the bar are made from strap iron as will be obvious although the same may be otherwise made if found desirable.

What is claimed is:

1. A device of the character described comprising a pair of inverted substantially U-shaped hangers, a connecting bar adjustably secured to said hangers, pairs of downwardly divergent arms adjustably connected to the hangers and having inwardly and upwardly extending extension rests, a pair of pans supported on said rests, means for detachably securing the pans to the arms, and plant brushing and boll weevil guiding means carried by the arms above the pans.

2. A device of the character described comprising a pair of inverted substantially U-shaped hangers, a connecting bar adjustably secured to said hangers, pairs of downwardly divergent arms adjustably connected to the hangers and having inwardly and upwardly extending extension rests, a pair of pans supported on said rests, coöperative means for detachably clamping the pans to the arms, plant brushing and boll weevil guiding means carried by the arms above the pans, plates secured to the arms above the pans and brush stocks fixed to the inner faces of the plates in spaced relation to each other and having brush bristles, the bristles in each stock gradually increasing in length from the uppermost to the lowermost ends of said stocks.

3. A boll weevil catcher comprising a pair of inverted substantially U-shaped hangers, means for adjustably connecting the hangers, arms adjustably suspended from the hangers and having rests at their lower ends, pans supported upon the rests and having inturned flanges at their upper marginal edges, a plurality of hook members each embodying a bill detachably engaged upon the flanges of the adjacent pan and a threaded shank continuing from the bill and engaged in and projecting through the adjacent arm, means adjustably engageable with each shank for clamping the bills to assure of the retention of the pans and plant brushing and boll weevil guiding means mounted on the arms above the pans.

In testimony whereof I affix my signature.

REED R. HITT.